(12) United States Patent
Gaddipati et al.

(10) Patent No.: US 11,540,541 B2
(45) Date of Patent: *Jan. 3, 2023

(54) PROCESS FOR THE PRODUCTION OF A BOUILLON POWDER, A BOUILLON POWDER AND ITS USE

(71) Applicant: SOCIETE DES PRODUITS NESTLE S.A., Vevey (CH)

(72) Inventors: Sanyasi Gaddipati, Singen (DE); Jimmy Perdana, Singen (DE); Youngbin Kim, Singen (DE); Annabel Bozon, Sheffield (GB); Volker Schroeder, Heiligenberg (DE)

(73) Assignee: Societe des Produits Nestle S.A., Vevey (CH)

( * ) Notice: Subject to any disclaimer, the term of this patent is extended or adjusted under 35 U.S.C. 154(b) by 294 days.

This patent is subject to a terminal disclaimer.

(21) Appl. No.: 16/758,248

(22) PCT Filed: Oct. 22, 2018

(86) PCT No.: PCT/EP2018/078831
§ 371 (c)(1),
(2) Date: Apr. 22, 2020

(87) PCT Pub. No.: WO2019/081396
PCT Pub. Date: May 2, 2019

(65) Prior Publication Data
US 2020/0337346 A1    Oct. 29, 2020

(30) Foreign Application Priority Data
Oct. 26, 2017  (EP) .................................... 17198519

(51) Int. Cl.
| A23L 23/10 | (2016.01) |
| A23L 33/22 | (2016.01) |
| A23L 27/40 | (2016.01) |
| A23L 29/30 | (2016.01) |
| A23L 33/115 | (2016.01) |
| A23L 31/15 | (2016.01) |
| A23P 10/40 | (2016.01) |

(52) U.S. Cl.
CPC ............... *A23L 23/10* (2016.08); *A23L 27/40* (2016.08); *A23L 29/35* (2016.08); *A23L 31/15* (2016.08); *A23L 33/115* (2016.08); *A23L 33/22* (2016.08); *A23P 10/40* (2016.08); *A23V 2002/00* (2013.01)

(58) Field of Classification Search
CPC ........ A23L 23/10; A23L 33/115; A23L 33/22; A23L 27/40; A23L 29/35; A23L 31/15; A23P 10/40
See application file for complete search history.

(56) References Cited

U.S. PATENT DOCUMENTS

| 2014/0017369 A1 | 1/2014 | Soquet et al. |
| 2014/0120222 A1 | 5/2014 | Schroeder et al. |
| 2020/0337329 A1* | 10/2020 | Gaddipati ............... A23P 10/40 |
| 2020/0337355 A1* | 10/2020 | Gaddipati ............... A23L 33/22 |

FOREIGN PATENT DOCUMENTS

| CN | 103653094 | | 3/2014 | |
| DE | 202008008195 U1 | | 3/2009 | |
| EP | 1138211 | | 10/2001 | |
| JP | H07278586 A | * | 10/1995 | ............. A23L 1/325 |
| JP | 2001069955 | | 3/2001 | |
| RU | 2116731 C1 | | 8/1998 | |
| RU | 2308207 C2 | | 10/2007 | |
| WO | 2007085609 | | 8/2007 | |

OTHER PUBLICATIONS

Russia Patent Office Communication for Application No. 2020112835/10(021718), dated Jan. 21, 2022, 11 pages.

* cited by examiner

*Primary Examiner* — Changqing Li
(74) *Attorney, Agent, or Firm* — K&L Gates LLP

(57) ABSTRACT

The invention relates to a manufacturing process for the production of a bouillon powder. In particularly the invention relates to a process for the production of a bouillon powder comprising a lipid-fiber powder. The invention also relates to the product obtained and the use thereof for preparing a food product.

12 Claims, No Drawings

PROCESS FOR THE PRODUCTION OF A BOUILLON POWDER, A BOUILLON POWDER AND ITS USE

CROSS REFERENCE TO RELATED APPLICATIONS

The present application is a National Stage of International Application No. PCT/EP2018/078831, filed on Oct. 22, 2018, which claims priority to European Patent Application No. 17198519.5, filed on Oct. 26, 2017, the entire contents of which are being incorporated herein by reference.

TECHNICAL FIELD

The invention relates to a manufacturing process for the production of a bouillon powder. In particularly the invention relates to a process for the production of a bouillon powder comprising a lipid-fiber powder.

BACKGROUND

Fats and oils are often added in foods to provide nutrition, taste/aroma, texture, specific processing role, and/or to drive consumers liking. Current trends are toward healthier fats; usually reflected in lower SFA, TFA, and minimally processed (e.g. non-hydrogenated, non-interesterified) fats or oils. Replacing hard fats e.g. with healthier oils is however not trivial. Issues in processing or consumer-related complains may arise. Practical examples in bouillon production, direct replacement of hard fat with oil is detrimental to powder flow-ability leading to manufacturing issues. Furthermore, one may expect severe oil staining that are detested by consumers.

A conventional way of manufacturing hard bouillon tablets comprises mixing powdered bouillon components with fat and no or only little amounts of oil, and pressing the mix into tablet form.

The most common used fat is palm fat as it provides good technical properties having a good flow-ability of the bouillon powder. In addition palm fat delivers good binding properties to a hard bouillon itself resulting in a good hardness of the tablet but still easy to crumble. Consumers are increasingly becoming sensitive to palm fat concerns. Many of them perceive palm fat as not healthy and many others perceive it as not environmentally sustainable as a lot of news mention that the rain forest is destroyed to grow palm trees. In addition nowadays there is a nutritional trend to avoid or at least reduce consumption of fats rich in trans-fatty acids and saturated fatty acids and to preferably consume healthy oils rich in monounsaturated fatty acids and/or polyunsaturated fatty acids such as sunflower, safflower, rapeseed and/or olive oil, for example.

Particular oil and fats are also relevant for product formulations from taste and aroma perspective. For example, chicken fats added in chicken bouillon recipes may eliminate the use of expensive and/or artificial flavors to deliver chicken taste/aroma. Challenges is that a small amount of chicken fat has been detrimental to flow-ability of bouillon powder.

An even dispersion of the lipid with the other ingredients is essential to achieve a homogenous product avoiding the formation of lumps, which can be cumbersome as lipid is introduced in liquid form. A good flow-ability of the bouillon powder or dehydrated soup is needed. The bouillon powder can be filled directly as a free flow-able powder into a packaging container or the bouillon powder can be pressed into tablet or cube form (hard bouillon tablet/cube). In addition the used lipid in a bouillon powder/hard bouillon tablet should not stain the packaging material.

Hence, it was the object of the present invention to provide the art with a manufacturing process for the production of a bouillon powder. This bouillon powder is suitable to use for the preparation of bouillon tablets/cubes.

SUMMARY OF THE INVENTION

The object of the present invention is to improve the state of the art or at least provide an alternative for a bouillon powder:
i) the powdered lipid-fiber has a good flow-ability with flow-ability index (FFC) above 1.8 at 23° C.;
ii) incorporate healthier lipid in a higher amount (more than 4 wt %) in a food product having good flow-ability and without observing oil-staining;
iii) avoid using palm fat;
iv) avoid the usage of hydrogenated or interesterified oils and fats;
v) use a powdered lipid which seems stable against rancidity;
vi) Preferably no added emulsifier or added protein needed within the lipid-fiber powder;
vii) The powdered lipid-fiber keeps a powdered structure even at high temperature e.g. up to 120° C.;
viii) good flow-ability of a bouillon powder using a powdered lipid-fiber of the invention (FFC above 2.5 at 23° C.);
ix) process simplification for preparing a hard bouillon tablet as no storage time is needed to re-crystallize the fat;
x) improve dosing accuracy;
xi) better distribution of the powdered lipid-fiber of the invention during mixing with other ingredients;
xii) avoid lumps and stickiness during mixing with other ingredients;
xiii) no lump by same mixing parameters with other ingredients (batch size, speed and time);
xiv) reduce factory complexity of handling two fats—for example oil and palm fat;
xv) reach a shelf life over 12 month with the same sensory properties;

The object of the present invention is achieved by the subject matter of the independent claims. The dependent claims further develop the idea of the present invention.

Accordingly, the present invention provides in a first aspect a process for the production of a bouillon powder comprising the steps of:
a) forming a mixture comprising 40 to 78 wt % (dry weight percent of the mixture) of a lipid composition having a solid fat content (SFC) at 20° C. below 12 wt %, and 22 to 60 wt % (dry weight percent of the mixture) of a fiber characterized by having a rate of hydration between 15 to 500 cP/min, and water, wherein the water is present at a weight ratio of fiber to water between 1:2.5 and 1:30;
b) drying the mixture of step a) to obtain a lipid-fiber powder;
c) optionally milling the lipid-fiber powder after the drying step b); and
d) mixing 30 to 80 wt % crystalline ingredients (by weight of the bouillon powder), 2 to 35 wt % amorphous ingredients (by weight of the bouillon powder), 0.5 to 20 wt % flavourings (by weight of the bouillon powder), and 4 to 30 wt % of the lipid-fiber powder (by weight of the bouillon powder) in order to obtain the bouillon powder.

In a second aspect of the invention, there is provided a product obtainable by process for the production of a bouillon powder comprising the steps of:
a) forming a mixture comprising 40 to 78 wt % (dry weight percent of the mixture) of a lipid composition having a solid fat content (SFC) at 20° C. below 12 wt %, and 22 to 60 wt % (dry weight percent of the mixture) of a fiber characterized by having a rate of hydration between 15 to 500 cP/min, and water, wherein the water is present at a weight ratio of fiber to water between 1:2.5 and 1:30;
b) drying the mixture of step a) to obtain a lipid-fiber powder;
c) optionally milling the lipid-fiber powder after the drying step b); and
d) mixing 30 to 80 wt % crystalline ingredients (by weight of the bouillon powder), 2 to 35 wt % amorphous ingredients (by weight of the bouillon powder), 0.5 to 20 wt % flavourings (by weight of the bouillon powder), and 4 to 30 wt % of the lipid-fiber powder (by weight of the bouillon powder) in order to obtain the bouillon powder.

A third aspect of the invention relates to a food product prepared by making use of the bouillon powder of the invention.

It has been surprisingly found by the inventors that by the process of the invention a bouillon powder comprising a lipid-fiber powder comprising 40 to 78 wt % (by weight of the lipid-fiber) of a lipid composition having a solid fat content (SFC) at 20° C. below 12 wt %, and 22 to 60 wt % (by weight of the lipid-fiber) of a fiber characterized by having a rate of hydration between 15 to 500 cP/min, can be obtained which can now solve the requirement to achieve the necessary attributes:

the powdered lipid-fiber of the invention has good flow-ability (FFC above 1.8 at 23° C.);
incorporate healthier lipid in a higher amount (more than 4 wt %) in a food product having good flow-ability and without oil-staining;
preferably no added emulsifier or added protein needed;
the lipid-fiber powder keeps a powdered structure even at high temperature e.g. up to 120° C.;
the powdered lipid-fiber seems stable against rancidity;
improved dosing properties and no caking;
a bouillon powder having a good flow-ability (FFC above 2.5 at 23° C.);
no lumping by mixing with other ingredients;
the usage of palm fat or hydrogenated fat can be avoided/replaced;
no structuring agents are needed to reach a good flow-ability;
bouillon powder reach a shelf life over 12 month with the same sensory properties;
use a fat e.g. chicken fat which enables the reduction of added flavour within a recipe;

DETAILED DESCRIPTION

The present invention pertains to a process for the production of a bouillon powder comprising the steps of:
a) forming a mixture comprising 40 to 78 wt % (dry weight percent of the mixture) of a lipid composition having a solid fat content (SFC) at 20° C. below 12 wt %, and 22 to 60 wt % (dry weight percent of the mixture) of a fiber characterized by having a rate of hydration between 15 to 500 cP/min, and water, wherein the water is present at a weight ratio of fiber to water between 1:2.5 and 1:30;
b) drying the mixture of step a) to obtain a lipid-fiber powder;
c) optionally milling the lipid-fiber powder after the drying step b); and
d) mixing 30 to 80 wt % crystalline ingredients (by weight of the bouillon powder), 2 to 35 wt % amorphous ingredients (by weight of the bouillon powder), 0.5 to 20 wt % flavourings (by weight of the bouillon powder), and 4 to 30 wt % of the lipid-fiber powder (by weight of the bouillon powder) in order to obtain the bouillon powder.

"Lipid-fiber powder" according to this invention has particle size distribution with a median diameter Dv50 in the range of 15 to 5000 μm, preferably in the range of 20 to 5000 μm, preferably in the range of 30 to 3000 μm, preferably in the range of 30 to 1500 μm, preferably in the range of 40 to 1500 μm, preferably in the range of 40 to 1000 μm, preferably in the range of 50 to 1000 μm, preferably in the range of 80 to 1000 μm, preferably in the range of 80 to 700 μm, preferably in the range of 100 to 700 μm, preferably in the range of 150 to 700 μm, preferably in the range of 150 to 500 μm. In a further embodiment "lipid-fiber powder" according to this invention has a water activity below 0.50, preferably below 0.40, preferably below 0.35, more preferably below 0.30, more preferably below 0.25, more preferably below 0.20. The bouillon powder comprises 4 to 30 wt % of the lipid-fiber powder (by weight of the bouillon powder), preferably 7 to 30 wt %, preferably 10 to 30 wt %, preferably 10 to 27 wt %, preferably 12 to 27 wt %, preferably 10 to 25 wt %, preferably 10 to 20 wt % (by weight of the bouillon powder).

The particle size Dv50 is used in the conventional sense as the median of the particle size distribution. Median values are defined as the value where half of the population resides above this point, and half resides below this point. The Dv50 is the size in microns that splits the distribution with half above and half below this diameter. The particle size distribution may be measured by laser light scattering, microscopy or microscopy combined with image analysis. For example, the particle size distribution may be measured by laser light scattering. Since the primary result from laser diffraction is a volume distribution, the Dv50 cited is the volume median.

"Lipid" of the present invention has a solid fat content (SFC) at 20° C. below 12 wt %, preferably has a solid fat content (SFC) at 20° C. between 0 to 12 wt %, preferably has a solid fat content (SFC) at 20° C. between 0 to 10 wt %, preferably has a solid fat content (SFC) at 20° C. between 0 to 8 wt %, preferably has a solid fat content (SFC) at 20° C. between 0 to 6 wt %. The lipid of the present invention has a solid fat content (SFC) at 20° C. below 6 wt %. Lipid according to this invention is an oil or a fat or a combination thereof. Oil is liquid at a temperature of 25° C., preferably at a room temperature of 20° C. Sunflower oil has a solid fat content (SFC) at 20° C. of 0. Olive oil has a solid fat content (SFC) at 20° C. of 0. Chicken fat has a solid fat content (SFC) at 20° C. of 3.7. Palm fat has a solid fat content (SFC) at 20° C. between 20 to 65. The solid fat content shows that according to the invention palm fat is excluded as it is solid at a temperature of 25° C., preferably at room temperature of 20° C.

In a preferred embodiment the lipid is selected from the group consisting of sunflower oil, rapeseed oil, cotton seed oil, peanut oil, soy oil, olive oil, chicken fat, duck fat, goose fat, insect fat, algal oil, safflower oil, corn oil, rice bran oil, sesame oil, hazelnut oil, avocado oil, almond oil, walnut oil or a combination thereof; more preferably sunflower oil, rapeseed oil, or chicken fat. In a further embodiment, the lipid-fiber powder comprises lipid in an amount in the range of 40 to 78% (by weight of the lipid-fiber powder), preferably between 45 to 78%, preferably between 50 to 78%, preferably 55 to 78%, preferably 60 to 78% (by weight of the lipid-fiber powder).

"Fiber" according to this invention has a rate of hydration between 15 to 500 cP/min, preferably 25 to 400 cP/min, preferably 50 to 350 cP/min. The cP/min can be recalculated to cP/sec and 1 cP=$10^{-3}$ Pa·s. In a preferred embodiment fiber having a rate of hydration between 0.250 to 8.333 cP/sec, preferably 0.417 to 6.666 cP/sec, preferably 0.833 to 5.833 cP/sec.

"Rate of hydration" according to this invention is defined as the time required for the fiber to interact with water and swell resulting an increase in viscosity.

In a preferred embodiment fiber is a water insoluble dietary fiber, preferably a water insoluble vegetable dietary fiber. It is selected from at least one of carrot, beetroot, pumpkin or combinations thereof.

Fiber has particle size with median diameter Dv50 in the range of 5 to 400 μm, preferably in the range of 10 to 400 μm, preferably in the range of 15 to 400 μm, preferably in the range of 20 to 400 μm, preferably 25 to 375 μm, preferably 30 to 350 μm; preferably 35 to 300 μm.

In a further embodiment, the lipid-fiber powder comprises fiber in an amount in the range of 22 to 60% (by weight of the lipid-fiber powder), preferably between 22 to 55%, preferably between 22 to 50%, preferably 22 to 45%, preferably 22 to 40% (by weight of the lipid-fiber powder). In a further embodiment, the mixture of process step a) comprises fiber in an amount in the range of 22 to 60% (by weight of the lipid-fiber powder), preferably between 22 to 55%, preferably between 22 to 50%, preferably 22 to 45%, preferably 22 to 40% (by weight of the lipid-fiber powder).

In an embodiment water is added at a weight ratio of fiber to water between 1:2.5 and 1:35, preferably between 1:3 and 1:30, preferably between 1:3.5 and 1:30, preferably between 1:3.5 and 1:25, preferably between 1:3.5 and 1:20.

"Dietary fiber" consists of the remnants of the edible plant cell, polysaccharides, lignin, and associated substances resistant to digestion (hydrolysis) by human alimentary enzymes.

In a preferred embodiment, the lipid-fiber powder and therefore the mixture of process step a) of the present invention does not include any emulsifier, added proteins or combinations thereof. The term "emulsifier" is selected from the group consisting of egg yolk, lecithin, mustard, soy lecithin, sodium phospates, sodium stearoyl lactylate, diacetyl tartaric ester of monoglyceride (DATEM), polyglycerol-polyricinoleate (PGPR), monoglyceride and mono-diglyceride or a combination thereof. The term "protein" is selected from the group consisting of milk and/or whey proteins, soy proteins, pea proteins, caseinate, egg albumen, lysozyme, gluten, rice protein, corn protein, potato protein, pea protein, skimmed milk proteins or any kind of globular and random coil proteins as well as combinations thereof.

The drying step can be carried out by any commonly known drying technique such as air drying, oven drying, ventilation, spray drying, vacuum drying, bed drying, microwave-vacuum drying, infrared radiation drying or combinations thereof. The drying temperature is between 50 to 120° C., preferably between 50 to 110° C., preferably between 60 to 100° C., preferably between 60 to 90° C.

Milling according to this invention is a process that breaks solid materials into smaller pieces by grinding, crushing, or cutting. Milling can be carried out by any commonly known milling techniques such as roll mill, hammer mill, chopper mill, ball mill, SAG mil, rod mil or combinations thereof.

As it is shown within the experimental part independently of the mixing sequence of the fiber, lipid, and water a powdered lipid can be obtained after drying. In case fiber and water is mixed first the viscosity of this mixture is higher due to the swelling of the fiber. Therefore adding lipid to the fiber-water-suspension needs a longer mixing time or a higher mixing shear rate to obtain a homogenous lipid-fiber-water mixture. In a preferred embodiment the fiber and lipid is mixed first and water is added afterwards and further mixed. This process sequence has the advantage that the resulting lipid-fiber-water-suspension ensures a better homogenous mixture in less time or lower mixing shear rate.

"Flow-ability" means flow properties on how easily a powder flows. Flow-ability ($ff_c$) is quantified as the ratio of consolidation stress $\sigma_1$ to unconfined yield strength $\sigma_c$ according to "Schulze, D. (2006). Flow properties of powders and bulk solids. Braunschweig/Wolfenbuttel, Germany: University of Applied Sciences." In an embodiment flow-ability ($ff_c$) of the lipid-fiber powder is at least 1.8 at 23° C., preferably between the range of 1.8 to 12 at 23° C., preferably between the range of 1.9 to 10 at 23° C., preferably between the range of 1.9 to 8 at 23° C., preferably between the range of 1.9 to 6 at 23° C. In an embodiment flow-ability of the bouillon powder using lipid-fiber powder is at least 2.5 at 23° C., preferably between the range of 2.5 to 20 at 23° C., preferably between the range of 2.6 to 15 at 23° C., preferably between the range of 2.6 to 10 at 23° C., preferably between the range of 2.8 to 10 at 23° C., preferably between the range of 2.8 to 7 at 23° C., preferably between the range of 2.8 to 6 at 23° C.

"Bouillon powder" means a dehydrated stock that is in powder form. In an embodiment a bouillon powder comprises ingredients such as salt, taste enhancing compounds like monosodium glutamate (MSG), sugar, starch or flour, flavouring components, vegetables, meat extracts, spices, colorants and fat.

"Hard bouillon tablet" means "tablet or cube obtained by pressing a free flowing bouillon powder into a tablet or cube form"

"Crystalline ingredients" according to this invention means at least one ingredient of salt, monosodium glutamate or sugar. The bouillon powder comprises 30 to 80% (by weight of the composition) crystalline ingredients of at least one of salt, monosodium glutamate, sugar or citric acid anhydrous, preferably 35 to 75%, preferably 40 to 75%, preferably 40 to 70%, preferably 40 to 65%, preferably 45 to 65% (by weight of the composition) crystalline ingredients of at least one of salt, monosodium glutamate or sugar.

Salt is preferably sodium chloride, but can also comprise other edible salts capable of imparting or enhancing a salty taste perception, such as potassium chloride. In a further embodiment, the composition comprises salt in an amount in the range of 20 to 58% (by weight of the composition), preferably between 30 to 55%, preferably between 35 to 50% (by weight of the composition). In a further embodiment, the composition comprises monosodium glutamate in an amount in the range of 0 to 25% (by weight of the composition), preferably between 0 to 20%, preferably between 0 to 15%, preferably between 0.5 to 25%, preferably between 0.5 to 15%, preferably between 5 to 10% (by weight of the composition). In a further embodiment, the composition comprises sugar in an amount in the range of 0 to 20% (by weight of the composition), preferably between 0 to 15%, preferably between 0.5 to 15%, preferably between 5 to 10% (by weight of the composition). In a further embodiment, the composition comprises citric acid anhydrous in an amount in the range of 0 to 5% (by weight of the composition), preferably between 0.5 to 4%, preferably between 0.5 to 1.5% (by weight of the composition).

"Amorphous ingredients" according to this invention means at least one ingredient of yeast extract, maltodextrin, starches, flours, vegetable extract, glucose syrup, or onion powder. The bouillon powder comprises 2 to 35% amorphous ingredients (by weight of the composition) composed of at least one of yeast extract, maltodextrin, starches, flours vegetable extract or glycose syrup, preferably 3 to 35%, preferably 5 to 35%, preferably 5 to 30%, preferably 5 to 25%, preferably 5 to 20%, preferably 5 to 15%, preferably 7 to 12% (by weight of the composition). In a further embodiment, the composition comprises yeast extract in an amount in the range of 0 to 15% (by weight of the composition), preferably between 1 to 15%, preferably between 5 to 10% (by weight of the composition). In a further embodiment, the composition comprises starches and/or flours in an amount in the range of 0 to 15% (by weight of the composition), preferably between 1 to 15%, preferably between 5 to 10% (by weight of the composition). In a further embodiment, the composition comprises glucose syrup in an amount in the range of 0 to 15% (by weight of the composition), preferably between 1 to 15%, preferably between 5 to 10% (by weight of the composition). In a further embodiment, the composition comprises maltodextrin in an amount in the range of 0 to 15% (by weight of the composition), preferably between 1 to 15%, preferably between 5 to 10% (by weight of the composition).

The term "flavourings" in the context of the composition means flavouring agents, herbs, spices, vegetables, meat and fish components (in wet or powder form). Flavouring agents can include parsley, celery, fenugreek, lovage, rosemary, marjoram, dill, tarragon, coriander, ginger, lemongrass, curcuma, chili, ginger, paprika, mustard, garlic, onion, turmeric, tomato, coconut milk, cheese, oregano, thyme, basil, chilies, paprika, tomato, pimento, jalapeno pepper, white pepper powder and black pepper. In a further embodiment, the composition comprises flavourings in an amount in the range of 0.5 to 20% (by weight of the composition), preferably between 1 to 20%, preferably between 5 to 20% (by weight of the composition).

In an embodiment the bouillon powder is shelf-stable over 12 months and therefore has a water activity of below 0.5, preferably between 0.1 to 0.5.

EXAMPLES

The invention is further described with reference to the following examples. It is to be appreciated that the examples do not in any way limit the invention.

Example 1

Process

The general procedure for preparing oil powder of the invention is as follows:

Mixing fiber and oil

Add water and further mix

Drying

Milling (optional)

Fiber was mixed with oil in a Thermomix TM5 (Vorwerk &Co. KG). Mixing speed was set to speed 3. Mixing was performed at room temperature for 5 minute, until homogenous slurry was obtained. Subsequently, water was gradually added to the mixture while mixing parameters were maintained. Mixing was maintained for another 3 minute. The slurry was then spread onto a baking pan; slurry thickness was maintained between 5 and 10 mm, then dried in Rational Self Cooking Centre Electric Combination Oven SCC202E (Rational AG, Germany). Drying was carried out for 12 h at 70° C. with 30% fan speed.

In order to evaluate and understand rate of hydration of fiber, experiments were performed in the laboratory under controlled conditions using a Rapid Viscosity Analyser (Newport Scientific, Australia). The method has been slightly modified as described within the reference "Instant Emulsions, Tim Foster et al, pages 413-422 in Dickinson, E. and M. E. Leser (2007). Food Colloids: Self-assembly and Material Science, Royal Society of Chemistry." Rate of hydration of fibers were measured by following the change in viscosity with time. 2.5 g of fiber or non-fiber material was weighed and added to 22.5 g of water. Measurement was carried out at 25° C. under continuously steering at 160 rpm. The value for rate of hydration is determined by subtracting the final viscosity value from the initial viscosity value and then divided by the time, i.e. 10 min. When maximum (peak) viscosity value is observed earlier than 10 min (e.g. for the case of citrus fiber), the rate of hydration is determined by subtracting the maximum viscosity from the initial viscosity values and then divided by the time to reach this maximum viscosity value.

Example 2-8

Comp. Process without Added Water and Process with Added Water

In case oil is mixed only with fiber alone (no water added), no oil powder can be obtained independently if the rather slurry mixture has been dried and independently of the used oil-fiber ratio (comp. examples 2 to comp. examples 5)

Examples 6-8 have been prepared according to the process of example 1 (water added) resulting in an oil powder.

|  | Comp. Ex. 2 | Comp. Ex. 3 | Comp. Ex. 4 | Comp. Ex. 5 |
|---|---|---|---|---|
| Oil (sunflower) [wt %] | 78 | 78 | 50 | 67 |
| Fiber type | Carrot fiber | Carrot fiber | Carrot fiber | Carrot fiber |
| Fiber [wt %] | 22 | 22 | 50 | 33 |
| Water [in weight ratio of fiber to water] | 1:0 (no water added) | 1:0 (no water added) | 1:0 (no water added) | 1:0 (no water added) |
| Drying temp. [° C.] | Not dried. | 70 | 70 | 70 |
| Flow-ability index | n.a. as no oil powder | n.a. as no oil powder | n.a. as no oil powder | n.a. as no oil powder |

|  | Ex. 6 | Ex. 7 | Ex. 8 |
|---|---|---|---|
| Oil (sunflower) [wt %] | 78 | 50 | 67 |
| Fiber type | Carrot fiber | Carrot fiber | Carrot fiber |
| Rate of hydration of fiber (cP/min) | 106 | 106 | 106 |
| Fiber [wt %] | 22 | 50 | 33 |
| Water [in weight ratio of fiber to water] | 1:9 | 1:9 | 1:9 |
| Drying temp. [° C.] | 70 | 70 | 70 |
| Flow-ability index | 2.1 | 6.2 | 3.5 |
| Comments | Oil powder | Oil powder | Oil powder |
| Induction period | 58 h | — | — |

The induction period of example 6 is defined as the period (measured in hours) during which no oxidative, volatile components are generated under certain defined conditions. The induction period is determined based on ISO method 6886:2006; Rancimat/Oxidative Stability Instrument; at 100.0±0.1° C.; 3.85±0.1 g powdered oil, airflow: 10.0 l/h. Example 6 has an induction period of 58 hours, wherein the corresponding standard sunfower oil has an induction period of 38 hours.

Examples 9-16

Different Origin of Fiber

Different kind of fibers have been tested according the process of example 1. Only vegetable fibers are resulting in an oil powder. All tested other fibers show oil separation and do not result in an oil powder. Examples 9 to 16 show that the rate of hydration of fiber should be between 15 to 500 cP/min to obtain an oil powder.

|  | Ex. 9 | Ex. 10 | Comp. Ex. 11 | Comp. Ex. 12 |
|---|---|---|---|---|
| Oil (sunflower) [wt %] | 78 | 78 | 78 | 78 |
| Fiber origin | Beet root | Pumpkin | Citrus | Apple |
| Rate of hydration of fiber (cP/min) | 104 | 253 | 5300 | 2 |
| Fiber [wt %] | 22 | 22 | 22 | 22 |
| Water [in weight ratio of fiber to water] | 1:9 | 1:9 | 1:9 | 1:9 |
| Drying temp. [° C.] | 70 | 70 | 70 | 70 |
| Flow-ability index | 2.0 | 2.0 | n.a. as no powder | n.a. as no powder |
| Comments | Oil powder | Oil powder | Oil separation | Oil separation |

|  | Comp. Ex. 13 | Comp. Ex. 14 | Com. Ex. 15 | Com. Ex. 16 |
|---|---|---|---|---|
| Oil (sunflower) [wt %] | 78 | 78 | 78 | 78 |
| Fiber origin | Oat | Pea | Wheat bran | Wheat fiber |
| Rate of hydration of fiber (cP/min) | 8 | 0.3 | 0.1 | 0.1 |
| Fiber [wt %] | 22 | 22 | 22 | 22 |
| Water [in weight ratio of fiber to water] | 1:9 | 1:9 | 1:9 | 1:9 |
| Drying temp. [° C.] | 70 | 70 | 70 | 70 |
| Flow-ability index | n.a. as no powder | n.a. as no powder | n.a. as no powder | n.a. as no powder |
| Comments | Oil separation | Oil separation | Oil separation | Oil separation |

Comparative Example 17-19

Other Non-Fiber Ingredients

When starch, inulin or hydrolyzed whey protein is used instead of fiber, no oil powder according to the process within example 1 can be obtained as the rate of hydration is not between 15 to 500 cP/min.

|  | Comp. Ex. 17 | Comp. Ex. 18 | Comp. Ex. 19 |
|---|---|---|---|
| Oil (sunflower) [wt %] | 78 | 78 | 78 |
| Non fiber ingredient | Native potato starch | Inulin | Hydrolyzed whey protein |
| Rate of hydration of fiber (cP/min) | 0.1 | 0.1 | 0.3 |
| Non fiber ingredient [wt %] | 22 | 22 | 22 |
| Water [in weight ratio of fiber to water] | 1:9 | 1:9 | 1:9 |
| Drying temp. [° C.] | 70 | 70 | 70 |
| Flow-ability index | n.a. as no powder | n.a. as no powder | n.a. as no powder |
| Comments | Oil separation | Oil separation | Oil separation |

Examples 20-24

Different Amount of Water

Different amount of water added to oil and carrot fiber have been tested according the process of example 1.

|  | Comp. Ex. 20 | Comp. Ex. 21 | Ex. 22 | Ex. 23 | Ex. 24 |
|---|---|---|---|---|---|
| Oil (sunflower oil) [wt %] | 78 | 78 | 78 | 78 | 78 |
| Carrot Fiber [gram] | 22 | 22 | 22 | 22 | 22 |
| Water [in weight ratio of fiber to water] | 2:1 | 1:2 | 1:4 | 1:12 | 1:25 |
| Drying temp. [° C.] | 70 | 70 | 70 | 70 | 70 |
| Flow-ability index | n.a. as no powder | n.a. as no powder | 2.0 | 2.1 | 2.1 |
| Comments | Slurry. Oil separation | Before drying: sandy texture; after drying: oil separation | Oil powder | Oil powder | Oil powder |

Example 25-26

Different Origin of Oil

Different oils resulted in an oil powder according to example 1.

|  | Ex. 25 | Ex. 26 |
|---|---|---|
| Oil origin | Olive | Chicken fat |
| Oil amount [gram] | 78 | 78 |
| Carrot fiber [gram] | 22 | 22 |
| Water [in weight ratio of fiber to water] | 1:9 | 1:9 |
| Drying temp. [° C.] | 70 | 70 |
| Flow-ability index | 2.1 | 2.1 |
| Comments | Oil powder | Oil powder |

Example 27-29

Different Particle Size of Fibers

Four different carrot fibers regarding the particle size have been tested according to example 1.

|  | Ex. 6 (repetition of example) | Ex. 27 | Ex. 28 | Ex. 29 |
|---|---|---|---|---|
| Oil (sunflower oil) [gram] | 78 | 78 | 78 | 78 |
| Carrot Fiber [gram] | 22 | 22 | 22 | 22 |
| Carrot fiber Dv50 [μm] | 30 | 75 | 170 | 250 |
| Water [in weight ratio of fiber to water] | 1:9 | 1:9 | 1:9 | 1:9 |
| Drying temp. [° C.] | 70 | 70 | 70 | 70 |
| Flow-ability index | 2.1 | 2.0 | 2.1 | 2.0 |
| Comments | Oil powder | Oil powder | Oil powder | Oil powder |

It can be concluded that the tested particle size does not have an influence on the preparation of an oil powder.

Examples 30-38

Different Fiber/Oil Ratios

Different fiber/oil ratios have been tested according to example 1.

|  | Ex. 30 | Ex. 31 | Ex. 32 | Comp. Ex. 33 |
|---|---|---|---|---|
| Oil (sunflower oil) [wt %] | 50 | 67 | 75 | 80 |
| Carrot Fiber [wt %] | 50 | 33 | 25 | 20 |
| Water [in weight ratio of fiber to water] | 1:9 | 1:9 | 1:9 | 1:9 |
| Drying temp. [° C.] | 70 | 70 | 70 | 70 |
| Flow-ability | 6.2 | 3.5 | 2.5 | 1.7 |
| Comments | Oil powder | Oil powder | Oil powder | Oil lumps, wet texture |

|  | Ex. 34 | Ex. 35 | Ex. 36 | Ex. 37 | Comp. Ex. 38 |
|---|---|---|---|---|---|
| Oil (chicken fat) [wt %] | 50 | 60 | 67 | 75 | 80 |
| Carrot Fiber [wt %] | 50 | 40 | 33 | 25 | 20 |
| Water [in weight ratio of fiber to water] | 1:9 | 1:9 | 1:9 | 1:9 | 1:9 |

-continued

|  |  |  |  |  |  |
|---|---|---|---|---|---|
| Drying temp. [° C.] | 70 | 70 | 70 | 70 | 70 |
| Flow-ability | 5.9 | 4.4 | 3.3 | 2.4 | 1.7 |
| Comments | Oil powder | Oil powder | Oil powder | Oil powder | Oil lumps, wet texture |

Example 39-41

Alternative Process

The sequence of mixing has been changed as follow compared to example 1:

Mixing fiber with water
Add oil and further mix
Drying
Milling (optional)

|  | Ex. 39 | Ex. 40 | Ex. 41 |
|---|---|---|---|
| Oil (sunflower) [wt %] | 50 | 67 | 78 |
| Fiber type | Carrot fiber | Carrot fiber | Carrot fiber |
| Fiber [wt %] | 50 | 33 | 22 |
| Water [in weight ratio of fiber to water] | 1:9 | 1:9 | 1:9 |
| Drying temp. [° C.] | 70 | 70 | 70 |
| Comments | Oil powder | Oil powder | Oil powder |

It is shown within examples 39-41 that also with a different sequence of mixing the fiber, oil and water a powdered lipid-fiber can be obtained.

Examples 42-52

Bouillon Powders and Hard Tablets with Powdered Lipid-fiber

Preparation of Bouillon (Seasoning) Powder with Powdered Fat:

All non-lipid-fiber ingredients (crystalline ingredients, amorphous ingredients and flavourings were weighted in PG5002S balance (Mettler-Toledo, USA) and then mixed manually. The powdered lipid-fiber was added to the other pre-mixed ingredients and further mixed using Thermomix Type 31-1 (Vorwerk Elektrowerke GmbH & Co.AG, Germany) at speed 3 for 30 s with propeller rotation set to reverse direction. One batch mixing was carried out for 500 g bouillon powder. The resulting powder was then immediately used to measure flow-ability as no fat recrystallization time is relevant.

Pressing of Bouillon Tablet

Bouillon pressing was carried out with Flexitab Tablet Pressing equipment (Roltgen GmbH, Germany). Ten gram of bouillon powder was fed to tableting mold (31 mm in length and 23 mm in width) and the Roltgen tablet pressing was adjusted (between 8 and 11 mm) to reach a pressing force of 15 kN.

Measurement of Bouillon Tablet Hardness

Hardness measurement was carried out using Texture Analyser TA-HDplus (Stable Micro System, UK) equipped with 250 kg load cell and P/75 compression platen. Texture Analyser test mode was set to "Compression" with pre-test speed of 1 mm/s, test speed of 0.5 mm/s, post-test speed of 10 mm/s, target mode of "Distance", distance of 3 mm, halt time was set to "No", way back of 10 mm, trigger type to "Auto(Force), and trigger force of 50 gram. Bouillon tablet was placed centrally in vertical-landscape orientation. Hardness measurement was carried out in 10 replication.

Oiling Out Assessment

Immediately after pressing, bouillon tablets/cubes were placed horizontally on "Maggi" hard bouillon primary packaging. Subsequently the samples were stored for 4 days in a Climate Chamber ICH110 (Memmert GmbH+Co.KG, Germay) set to relative humidity (RH) of 30%, fan speed of 40%, and a temperatures of 37° C.

| Recipe | Comp. ex 42 | Comp ex. 43 | Ex. 44 |
|---|---|---|---|
| Salt [wt %] | 45.6 | 45.6 | 45.6 |
| Starch [wt %] | 14.2 | 17.5 | 14.2 |
| Sugar [wt %] | 10 | 10 | 10 |
| Yeast extract [wt %] | 3 | 3 | 3 |
| Flavorings [wt %] | 12.5 | 12.5 | 12.5 |
| Garnishes [wt %] | 0.4 | 0.4 | 0.4 |
| Water [wt %] | 1 | 1 | 1 |
| Chicken fat [wt %] | 10 | 10 | — |
| Fiber [wt %] | 3.3 | — | — |
| Powdered chicken fat-fiber [wt %] | — | — | 13.3 (10 fat:3.3 fiber → see ex. 36) |
| Mixing process | Severe mixer encrustation | Severe mixer encrustation | No encrustation |
| FFC of mixes at 23° C. | 2.3 | 2.2 | 2.9 |
| Appearance | Large lumps | Large lumps | No lumps |
| Water activity | 0.50 | 0.50 | 0.50 |
| Pressing process | Poor flowing | Poor flowing | Good flowing |
| Weight variation (%) | 2.9 | 4.9 | 0.8 |

| | | | | |
|---|---|---|---|---|
| Average Hardness (N) | 62 | 28 | 128 | |
| Tablet breakage (%) | 80 | 100 | 2 | |
| Oil staining at 37° C. | Severe oil staining | Severe oil staining | No oil staining | |

| Recipe | Ex. 45 | Ex. 46 | Ex. 47 | Ex. 48 |
|---|---|---|---|---|
| Salt [wt %] | 45.6 | 45.6 | 45.6 | 45.6 |
| Starch [wt %] | 7.5 | 10.8 | 12.5 | 5 |
| Sugar [wt %] | 10 | 10 | 10 | 10 |
| Yeast extract [wt %] | 3 | 3 | 3 | 3 |
| Flavorings [wt %] | 12.5 | 12.5 | 12.5 | 12.5 |
| Garnishes [wt %] | 0.4 | 0.4 | 0.4 | 0.4 |
| Water [wt %] | 1 | 1 | 1 | 1 |
| Chicken fat [wt %] | — | — | — | — |
| Fiber [wt %] | — | — | — | — |
| Powdered chicken fat-fiber [wt %] | 20 (10 fat:10 fiber → see ex. 34) | 16.7 (10 fat:6.7 fiber → see ex. 35) | 15 (10 fat:5 fiber → see ex. 36) | 22.5 (15 fat:7.5 fiber → see ex. 36) |
| Mixing process | No encrustation | No encrustation | No encrustation | No encrustation |
| FFC of mixes at 23° C. | 4.3 | 3.8 | 3.3 | 2.9 |
| Appearance | No lumps | No lumps | No lumps | No lumps |
| Water activity | 0.50 | 0.50 | 0.50 | 0.50 |
| Pressing process | Good flowing | Good flowing | Good flowing | Good flowing |
| Weight variation (%) | 0.5 | 0.6 | 0.6 | 0.9 |
| Average Hardness (N) | 190 | 172 | 150 | 128 |
| Tablet breakage (%) | 0 | 0 | 0 | 0 |
| Oil staining at 37° C. | No oil staining | No oil staining | No oil staining | No oil staining |

| Recipe | Comp. ex 49 | Comp ex. 50 | Ex. 51 | Ex. 52 |
|---|---|---|---|---|
| Salt [wt %] | 45.6 | 45.6 | 45.6 | 45.6 |
| Starch [wt %] | 14.2 | 17.5 | 14.2 | 5 |
| Sugar [wt %] | 10 | 10 | 10 | 10 |
| Yeast extract [wt %] | 3 | 3 | 3 | 3 |
| Flavorings [wt %] | 12.5 | 12.5 | 12.5 | 12.5 |
| Garnishes [wt %] | 0.4 | 0.4 | 0.4 | 0.4 |
| Water [wt %] | 1 | 1 | 1 | 1 |
| Sunflower Oil [wt %] | 10 | 10 | — | — |
| Fiber [wt %] | 3.3 | — | — | — |
| Powdered sunflower oil - fiber [wt %] | — | — | 13.3 (10 oil:3.3 fiber → see ex. 32) | 22.5 (15 oil:7.5 fiber → see ex. 31) |
| Mixing process | Severe mixer encrustation | Severe mixer encrustation, wet powder | No encrustation | No encrustation |
| FFC of mixes at 23° C. | 2.2 | 2.1 | 3.0 | 2.8 |
| Appearance | Large lumps | Large lumps | No lumps | No lumps |
| Water activity | 0.50 | 0.50 | 0.50 | 0.50 |
| Pressing process | Poor flowing | Poor flowing | Good flowing | Good flowing |
| Weight variation (%) | 3.2 | 5.0 | 0.7 | 0.9 |
| Average Hardness (N) | 50 | 30 | 125 | 130 |
| Tablet breakage (%) | 85 | 100 | 0 | 0 |
| Oil staining at 37° C. | Severe oil staining | Severe oil staining | No oil staining | No oil staining |

Examples 44-48 shows that by using a powdered lipid-fiber of the invention especially a powdered chicken fat leads to a better flow-ability of a bouillon powder instead the comparison examples 42 and 43 using chicken fat itself for the preparation of a bouillon powder. The better flow-ability of bouillon powder minimize weight variations in case a bouillon tablet is pressed. In addition after pressing the bouillon powder a better hardness of the bouillon tablet and therefore less tablet breakages and also less oil staining of the resulting hard bouillon tablet is obtained. These results of having a better flow-ability of a bouillon powder are further confirmed by examples 51-52 by using a powdered sunflower oil according to the invention instead of comparison examples 49-50 wherein sunflower oil itself is used. Also the resulting hard bouillon tablet has a higher hardness and therefore less tablet breakage and less oil staining in case a powdered sunflower oil is used. The hard bouillon tablet hardness is important for wrapping the hard bouillon tablet without breaking.

Examples 53 to 56

Comparison with WO2007085609

Comparison examples 53 and 54 are prepared according to WO2007085609 by using pre-wetted carrot fibers. Examples 55 and 56 are prepared according to the invention as described above.

| Recipe | Comp. ex 53 | Comp ex. 54 | Ex. 55 | Ex. 56 |
|---|---|---|---|---|
| Salt [wt %] | 43 | 43 | 43 | 43 |
| Maltodextrin [wt %] | 15 | 15 | 15 | 15 |
| MSG [wt %] | 16 | 12 | 16 | 12 |
| Starch | 12.5 | 9 | 12.5 | 9 |
| Flavorings [wt %] | 3.5 | 3.5 | 3.5 | 3.5 |
| Garnishes [wt %] | 0.7 | 0.7 | 0.7 | 0.7 |
| Water [wt %] | — | — | 1 | 1 |
| Sunflower Oil [wt %] | 5 | 12.5 | — | — |
| Wetted carrot fiber [wt %] (water:fiber) | 4.3 (1:3.3) | 4.3 (1:3.3) | | |
| Powdered sunflower oil - carrot fiber [wt %] (sunflower oil:fiber) | — | — | 8.3 (5:3.3) | 15.8 (12.5:3.3) |
| Mixing process | No encrustation | Encrustation | No encrustation | No encrustation |
| FFC of mixes at 23° C. | 2.7 | 2.1 | 3.3 | 2.9 |
| Appearance | No lumps | Large lumps | No lumps | No lumps |
| Water activity | 0.50 | 0.50 | 0.50 | 0.50 |

It is shown within comparison example 53 and example 55 that in case the process of the invention is used a better flow-ability of the bouillon mass can be obtained compared to WO2007085609. Comparison example 54 and 56 use a higher amount of oil as mentioned in WO2007085609. Nevertheless the effect to obtain a better flow-able bouillon powder is increased, wherein in addition within comparison example 55 an encrustation is observed and within example 56 no encrustation is observed.

The invention claimed is:

1. A process for the production of a bouillon powder, the process comprising:
   (i) forming a mixture comprising:
      a lipid composition comprising a lipid comprising a solid fat content at 20° C.;
      a fiber having a rate of hydration between 15 to 500 cP/min; and
      water;
   (ii) drying the mixture to obtain a lipid-fiber powder comprising:
      40 to 78 wt % (dry weight percent of the mixture) of said lipid composition, comprising: below 12 wt % of the lipid with a solid fat content at 20° C.,
      22 to 60 wt % (dry weight percent of the mixture) of said fiber, and a water activity below 0.50;
   (iii) mixing by weight of the bouillon powder:
      30 to 80 wt % of a crystalline ingredient,
      2 to 35 wt % of an amorphous ingredient,
      0.5 to 20 wt % of a flavouring, and
      4 to 30 wt % of the lipid-fiber powder,
      to obtain the bouillon powder.

2. The process of claim 1, wherein the fiber is a water insoluble dietary fiber.

3. The process of claim 1, wherein the fiber is selected from the group consisting of carrot, beetroot, pumpkin and combinations thereof.

4. The process of claim 1, wherein the lipid is an oil, a fat or a combination thereof.

5. The process of claim 1, wherein the lipid is selected from the group consisting of sunflower oil, rapeseed oil, cotton seed oil, peanut oil, soy oil, olive oil, chicken fat, duck fat, goose fat, insect fat, algal oil, safflower oil, corn oil, rice bran oil, sesame oil, hazelnut oil, avocado oil, almond oil, walnut oil and combinations thereof.

6. The process of claim 1, wherein the drying is performed at a temperature between 50° C. and 120° C.

7. The process of claim 1, wherein the drying comprises a method selected from the group consisting of oven drying, air drying, vacuum drying, bed drying, microwave-vacuum drying, spray-drying, infrared radiation drying and combinations thereof.

8. The process of claim 1, wherein the forming a mixture, further comprises: mixing the lipid composition and the fiber, then adding water and mixing again.

9. The process of claim 1, wherein the crystalline ingredient is selected from the group consisting of salt, monosodium glutamate, sugar anhydrous, citric acid anhydrous and combinations thereof.

10. The process of claim 1, wherein the amorphous ingredients is selected from the group consisting of yeast extract, maltodextrin, starches, flours, vegetable extract, glycose syrup, onion powder and combinations thereof.

11. The process of claim 1, wherein the bouillon powder has a flow-ability of at least 2.5 at 23° C.

12. A method for preparing a food product by making use of a bouillon powder, the method comprising:
   (i) forming a mixture comprising:
      a lipid composition comprising a lipid comprising a solid fat content at 20° C.;
      a fiber having a rate of hydration between 15 to 500 cP/min; and
      water;
   (ii) drying the mixture to obtain a lipid-fiber powder comprising:
      40 to 78 wt % (dry weight percent of the mixture) of said lipid composition, comprising: below 12 wt % of the lipid with a solid fat content at 20° C., 22 to 60 wt % (dry weight percent of the mixture) of said fiber, and
a water activity below 0.50;
(iii) mixing by weight of the bouillon powder:
30 to 80 wt % of a crystalline ingredient,
2 to 35 wt % of an amorphous ingredient,
0.5 to 20 wt % of a flavouring, and
4 to 30 wt % of the lipid-fiber powder,
to obtain the bouillon powder;
(iv) using the bouillon powder to prepare the food product.

* * * * *